US012782891B2

(12) United States Patent
Van Roy et al.

(10) Patent No.: US 12,782,891 B2
(45) Date of Patent: Nov. 3, 2026

(54) EXPLORATION USING HYPER-MODELS

(71) Applicant: GDM Holding LLC

(72) Inventors: Benjamin Van Roy, Stanford, CA (US); Xiuyuan Lu, Mountain View, CA (US); Vikranth Reddy Dwaracherla, Stanford, CA (US); Zheng Wen, Fremont, CA (US); Morteza Ibrahimi, Menlo Park, CA (US); Ian David Moffat Osband, London (GB)

(73) Assignee: GDM Holding LLC, Mountain View, CA (US)

( * ) Notice: Subject to any disclaimer, the term of this patent is extended or adjusted under 35 U.S.C. 154(b) by 1173 days.

(21) Appl. No.: 17/639,504

(22) PCT Filed: Sep. 25, 2020

(86) PCT No.: PCT/EP2020/076914

§ 371 (c)(1),
(2) Date: Mar. 1, 2022

(87) PCT Pub. No.: WO2021/058749

PCT Pub. Date: Apr. 1, 2021

(65) Prior Publication Data

US 2022/0326663 A1 Oct. 13, 2022

Related U.S. Application Data

(60) Provisional application No. 62/906,021, filed on Sep. 25, 2019.

(51) Int. Cl.

| | |
|---|---|
| ***G05B 13/04*** | (2006.01) |
| ***G05B 13/02*** | (2006.01) |
| ***G06N 20/00*** | (2019.01) |

(52) U.S. Cl.
CPC .......... *G05B 13/027* (2013.01); *G05B 13/04* (2013.01); *G06N 20/00* (2019.01)

(58) Field of Classification Search
CPC ....... G05B 13/027; G05B 13/04; G06N 20/00
See application file for complete search history.

(56) References Cited

U.S. PATENT DOCUMENTS

| | | | | |
|---|---|---|---|---|
| 2004/0054638 | A1 | 3/2004 | Agami et al. | |
| 2021/0089868 | A1* | 3/2021 | Theocharous | G06N 3/047 |

(Continued)

FOREIGN PATENT DOCUMENTS

| | | | |
|---|---|---|---|
| CN | 102737279 | A | 10/2012 |
| CN | 103985003 | A | 8/2014 |

(Continued)

OTHER PUBLICATIONS

Jamieson et.al, "Lecture 9: Linear Bandits and Thompson Sampling", Mar. 19, 2018 (Year: 2018).*

(Continued)

*Primary Examiner* — Alexey Shmatov
*Assistant Examiner* — Duy T Diep
(74) *Attorney, Agent, or Firm* — Fish & Richardson P.C.

(57) ABSTRACT

Methods, systems, and apparatus, including computer programs encoded on computer storage media, for controlling an agent. One of the methods includes sampling one or more index variables from a continuous space of possible index variables in accordance with a probability distribution over the continuous space; for each index variable: processing the index variable using a hypermodel, in accordance with values of a plurality of parameters of the hypermodel, to generate an output that specifies values of a plurality of parameters of an environment model; and generating an action selection output using the environment model in accordance with the values of the plurality of parameters of (Continued)

the environment model that are specified by the hypermodel output for the index variable; and selecting the action to be performed by the agent at the time step using the one or more action selection outputs for the one or more index variables.

20 Claims, 5 Drawing Sheets

(56) References Cited

U.S. PATENT DOCUMENTS

| | | | | |
|---|---|---|---|---|
| 2021/0201156 | A1* | 7/2021 | Hafner | G06N 3/084 |
| 2021/0357731 | A1* | 11/2021 | Van de Wiele | G06N 3/084 |

FOREIGN PATENT DOCUMENTS

| | | | |
|---|---|---|---|
| CN | 107016342 | A | 8/2017 |
| CN | 109143852 | A | 1/2019 |
| CN | 109155004 | A | 1/2019 |
| CN | 110085211 | A | 8/2019 |
| WO | WO 2019155061 | A1 | 8/2019 |

OTHER PUBLICATIONS

Baez-Ortega et.al, "Sampling in the hypersphere", Oct. 14, 2018 (Year: 2018).*
Ha et.al, "HYPERNETWORKS", Jan. 12, 2016 (Year: 2016).*
Oswald et.al, "Continual learning with hypernetworks", Jun. 3, 2019 (Year: 2019).*
Lee et.al, "Stochastic Latent Actor-Critic: Deep Reinforcement Learning with a Latent Variable Model", Jul. 1, 2019 (Year: 2019).*
Andrieu et al., "An introduction to MCMC for machine learning," Machine Learning, Jan. 2003, 50(1-2):5-43.
Blundell et al., "Weight uncertainty in neural networks," Proceedings of the 32nd International Conference on Machine Learning, 2015, 37:1613-1622.
Gal et al., "Dropout as a Bayesian approximation: Representing model uncertainty in deep learning," Proceedings of the 33rd International Conference on Machine Learning, 2016, 48:1050-1059.
Ha et al., "HyperNetworks," CoRR, Sep. 2016, arxiv.org/abs/1609.09106, 29 pages.
Hron et al., "Variational Gaussian dropout is not Bayesian," CoRR Nov. 2017, arXiv:1711.02989, 6 pages.
Hu et al., "Stein neural sampler," CoRR, Oct. 2018, arxiv.org/abs/1810.03545, 17 pages.
International Preliminary Report on Patentability in International Appln. No. PCT/EP2020/076914, dated Mar. 15, 2022, 8 pages.
International Search Report and Written Opinion in International Appln. No. PCT/EP2020/076914, dated Feb. 25, 2021, 9 pages.
Karaletsos et al., "Probabilistic meta-representations of neural networks," CoRR, Oct. 2018, arXiv: 1810.00555, 10 pages.
Krueger et al., "Bayesian hypernetworks," CoRR, Oct. 2017, arXiv:1710.04759, 13 pages.
Lu et al., "Ensemble sampling," Advances in Neural Information Processing Systems 30, 2017, pp. 3258-3266.
Lu et al., "The expressive power of neural networks: A view from the width," In Advances in Neural Information Processing Systems 30, 2017, pp. 6231-6239.
Nikolov et al., "Information-directed exploration for deep reinforcement learning," CoRR, Dec. 2018, arxiv.org/abs/1812.07544, 16 pages.
O'Donoghue et al., "The uncertainty bellman equation and exploration," Proceedings of the 35th International Conference on Machine Learning, 2018, 10 pages.
Osband et al., "Deep exploration via bootstrapped DQN," 30th Conference on Neural Information Processing Systems, 2016, 9 pages.
Osband et al., "Randomized prior functions for deep reinforcement learning," Advances in Neural Information Processing Systems 31, 2018, 13 pages.
Osband, "Risk versus uncertainty in deep learning: Bayes, bootstrap and the dangers of dropout," NIPS Workshop on Bayesian Deep Learning, 2016, 5 pages.
Pawlowski et al., "Implicit weight uncertainty in neural networks," CoRR, Nov. 2017, arXiv:1711.01297, 15 pages.
Riquelme et al., "Deep Bayesian bandits showdown," Sixth International Conference on Learning Representations, 2018, 27 pages.
Russo et al., "A tutorial on Thompson sampling," Foundations and Trends in Machine Learning, 2018, 11(1):1-96.
Russo et al., "Learning to optimize via information-directed sampling," Advances in Neural Information Processing Systems 27, 2014, 9 pages.
Tang et al., "Hierarchical Deep Multi agent Reinforcement Learning with Temporal Abstraction," CoRR, Sep. 2018, arxiv.org/abs/1809.09332, 14 pages.
Thompson, "On the likelihood that one unknown probability exceeds another in view of the evidence of two samples," Biometrika, Dec. 1933, 25(3-4):285-294.
Hui et al., "Research on Compiler Optimization Parameter Selection Method Based on Ensemble Learning," Journal of Information Engineering, 2019, 56(9): 2012-2026 (with English abstract).
Office Action in Chinese Appln. No. 202080062843.8, mailed on Dec. 17, 2025, 11 pages (with English translation).
Zhou et al., "Research on Visual Interaction Technology in Virtual Reality Flight Simulation Training," Acta Aeronautica et Astronautica Sinica, 2013, 34(10): 2391-2401 (with English abstract).

* cited by examiner

EXPLORATION USING HYPER-MODELS

CROSS-REFERENCE TO RELATED APPLICATION

This application is a National Stage Application under 35 U.S.C. § 371 and claims the benefit of International Application No. PCT/EP2020/076914, filed Sep. 25, 2020, which claims priority to U.S. Application No. 62/906,021, filed Sep. 25, 2019, the disclosure of which is incorporated herein by reference.

BACKGROUND

This specification relates to controlling agents using machine learning models. Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations that controls an agent interacting with an environment by selecting actions to be performed by the agent. In particular, the system controls the agent using a hypermodel that generates outputs that specify values of a plurality of parameters of an environment model.

Particular embodiments of the subject matter described in this specification can be implemented so as to realize one or more of the following advantages.

The system described in this specification selects actions to be performed by an agent interacting with an environment using a hypermodel and an environment model. The hypermodel processes an index variable sampled from a probability distribution over a continuous space of possible index variables to generate an output that specifies the values of the parameters of the environment model. The environment model generates action selection outputs in accordance with the parameter values specified by the hypermodel output. The system described in this specification may be understood as transforming the probability distribution over the continuous space of possible index variables into a probability distribution over the parameter values of the environment model which reflects uncertainty about the environment. The uncertainty about the environment changes over time as the system trains the hypermodel and the environment model based on interactions of the agent with the environment.

The system uses the hypermodel and the environment model to select actions that enable the agent to effectively explore the environment. The system achieves improved efficiency and performance compared to alternative systems, e.g., that separately train ensembles of different environment models. In particular, the system described in this specification can be understood to jointly train an ensemble of infinitely many environment models, i.e., each of which corresponds to a respective index variable from the continuous space of possible index variables. In this manner, the system achieves improvements in computational efficiency compared to alternative systems, e.g., that separately train each environment model in a finite ensemble of environment models. Moreover, the system described in this specification can represent uncertainty in the environment more effectively than alternative systems, e.g., that use a finite ensemble of environment models, thereby enabling the agent to explore the environment more effectively and ultimately achieve improved performance in accomplishing tasks in the environment.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
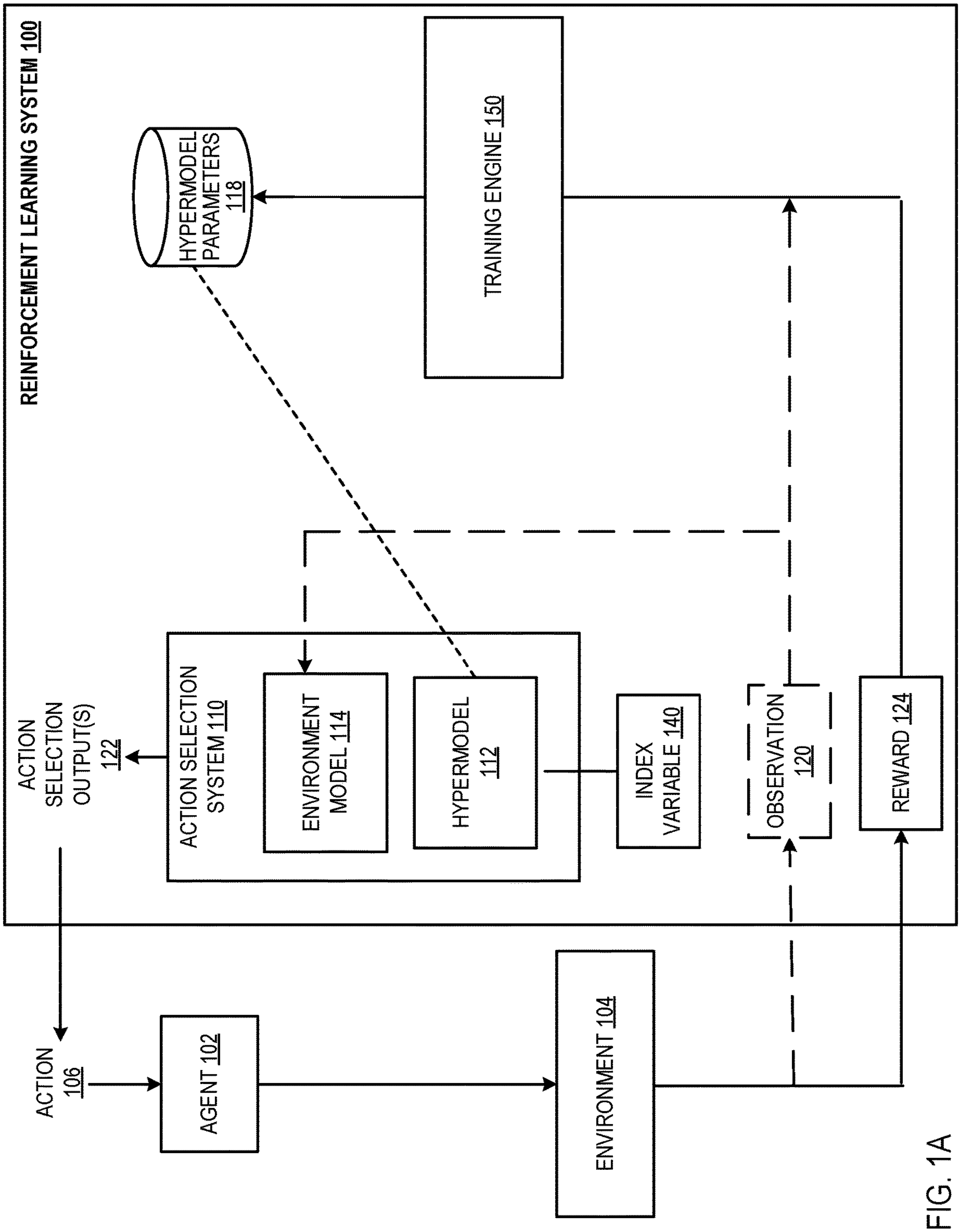
FIG. 1A shows an example control system.

This specification describes a system implemented as computer programs on one or more computers in one or more locations that controls an agent using a hypermodel to cause the agent to interact with an environment.

In some cases, the system selects actions to be performed by the agent at a given time step using an observation that characterizes the state of the environment at the time step. In other cases, the system selects the actions to be performed by the agent without an observation, i.e., based only on the experiences encoded in the parameter values of the hypermodel. In some implementations, the environment is a real-world environment and the agent is a mechanical agent interacting with the real-world environment. For example, the agent may be a robot interacting with the environment, e.g., to locate an object of interest in the environment, to move an object of interest to a specified location in the environment, to physically manipulate an object of interest in the environment, or to navigate to a specified destination in the environment; or the agent may be an autonomous or semi-autonomous land, air, or sea vehicle navigating through the environment to a specified destination in the environment.

In these implementations, the observations may include, for example, one or more of images, object position data, and sensor data to capture observations as the agent interacts with the environment, for example sensor data from an image, distance, or position sensor or from an actuator.

For example in the case of a robot the observations may include data characterizing the current state of the robot, e.g., one or more of: joint position, joint velocity, joint force, torque or acceleration, for example gravity-compensated torque feedback, and global or relative pose of an item held by the robot.

In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations.

The observations may also include, for example, sensed electronic signals such as motor current or a temperature signal; and/or image or video data for example from a camera or a LIDAR sensor, e.g., data from sensors of the agent or data from sensors that are located separately from the agent in the environment.

In the case of an electronic agent the observations may include data from one or more sensors monitoring part of a plant or service facility such as current, voltage, power, temperature and other sensors and/or electronic signals representing the functioning of electronic and/or mechanical items of equipment.

The actions may be control inputs to control a robot, e.g., torques for the joints of the robot or higher-level control commands, or the autonomous or semi-autonomous land or air or sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Actions may additionally or alternatively include electronic control data such as motor control data, or more generally data for controlling one or more electronic devices within the environment the control of which has an effect on the observed state of the environment. For example in the case of an autonomous or semi-autonomous land, air, or sea vehicle the actions may include actions to control navigation e.g. steering, and movement e.g., braking and/or acceleration of the vehicle.

In some implementations the environment is a simulated environment and the agent is implemented as one or more computers interacting with the simulated environment.

Training an agent in a simulated environment may enable the agent to learn from large amounts of simulated training data while avoiding risks associated with training the agent in a real world environment, e.g., damage to the agent due to performing poorly chosen actions. An agent trained in a simulated environment may thereafter be deployed in a real-world environment.

For example the simulated environment may be a motion simulation of a robot or vehicle, e.g., a driving simulation or a flight simulation. In these implementations, the actions may be control inputs to control the simulated user or simulated vehicle.

In another example, the simulated environment may be a video game and the agent may be a simulated user playing the video game.

In a further example the environment may be a protein folding environment such that each state is a respective state of a protein chain and the agent is a computer system for determining how to fold the protein chain. In this example, the actions are possible folding actions for folding the protein chain and the result to be achieved may include, e.g., folding the protein so that the protein is stable and so that it achieves a particular biological function. As another example, the agent may be a mechanical agent that performs or controls the protein folding actions selected by the system automatically without human interaction. The observations may include direct or indirect observations of a state of the protein and/or may be derived from simulation.

Generally in the case of a simulated environment the observations may include simulated versions of one or more of the previously described observations or types of observations and the actions may include simulated versions of one or more of the previously described actions or types of actions.

In some other applications the agent may control actions in a real-world environment including items of equipment, for example in a data center or grid mains power or water distribution system, or in a manufacturing plant or service facility. The observations may then relate to operation of the plant or facility. For example the observations may include observations of power or water usage by equipment, or observations of power generation or distribution control, or observations of usage of a resource or of waste production. The agent may control actions in the environment to increase efficiency, for example by reducing resource usage, and/or reduce the environmental impact of operations in the environment, for example by reducing waste. The actions may include actions controlling or imposing operating conditions on items of equipment of the plant/facility, and/or actions that result in changes to settings in the operation of the plant/facility e.g. to adjust or turn on/off components of the plant/facility.

In some applications, the environment is a content recommendation environment and the actions correspond to different items of content that can be recommend to a user. That is, each action is a recommendation of the corresponding item of content to the user. In these applications, the observations are data that represent the context of the content recommendation, e.g., data characterizing the user, data characterizing content items previously presented to the user, currently presented to the user, or both.

Optionally, in any of the above implementations, the observation at any given time step may include data from a previous time step that may be beneficial in characterizing the environment, e.g., the action performed at the previous time step.

FIG. 1A shows an example control system 100. The control system 100 is an example of a system implemented as computer programs on one or more computers in one or more locations in which the systems, components, and techniques described below are implemented.

The system 100 includes an action selection system 110, a training engine 150, and one or more memories storing a set of hypermodel parameters 118 of the action selection system 110.

The system 100 controls an agent 102 interacting with an environment 104 by, at each of multiple time steps, selecting an action 106 to be performed by the agent 102 using the action selection system 110 and then causing the agent 102 to perform the selected action 106.

Performance of the selected actions 106 by the agent 102 generally causes the environment 104 to transition into new states and causes the agent to receive a reward 124 from the environment 104.

Generally, the reward 124 is a numerical value that represents a quality of the selected action 106, e.g., in terms of one or more objectives that measure the effect of the action on the state of the environment or in terms of progress toward completing a specified task in the environment.

To select an action to be performed by the agent 102 at a given time step, the system 100 samples one or more index variables 140 for the time step. In particular, the system 100 samples each index variable 140 from a reference distribution over a continuous space of possible index variables. Examples of reference distributions are described below with reference to FIG. 2.

The system 100 then provides the sampled index variable(s) 140 as input to the action selection system 110.

The action selection system 110 processes the generated index variable(s) 140 and, optionally, an observation 120 characterizing the current state of the environment at the time step to generate one or more action selection outputs 122, i.e., to generate a respective action selection output 122 for each index variable 140.

In particular, the action selection output 122 includes a respective reward estimate (also referred to as a predicted reward) for each action in a set of actions that can be performed by the agent. The reward estimate for a given action is an estimate of a reward that would be received by the agent as a result of performing the action.

More specifically, the action selection system 110 includes a hypermodel 112 and an environment model 114.

The hypermodel 112 is one or more machine learning models that have parameters, i.e., hypermodel parameters 118, and that are configured to, for each index variable, process the index variable in accordance with values of the hypermodel parameters 118 to generate a hypermodel output that specifies values of a plurality of parameters of the environment model 114.

In other words, the output of the hypermodel for a given input index variable includes respective values for each of a plurality of the parameters of the environment model 114 ("environment parameters"). In some cases, the output of the hypermodel includes respective values for all of the parameters of the environment model 114. In other cases, the output of the hypermodel includes respective values for a proper subset of the parameters of the environment model and the remaining values are set by applying a fixed transformation to corresponding values in the proper subset. For example, the system 100 may constrain the value of a first parameter of the environment model 114 to have a linear relationship with the value of a second parameter of the environment model 114. The hypermodel output can then include a value for the first parameter and the system 100 can determine the value of the second parameter by applying the linear relationship.

The environment model 114 is a machine learning model that is configured to, for each index variable 140, receive an input that includes an action from the set of actions and optionally the observation 120 at the time step and to process the input in accordance with the values of the environment parameters of the environment model that are specified by the hypermodel for the index variable 140 to generate a predicted reward for the action. The environment model 114 may be understood as representing one or more aspects of the environment 104, in particular the predicted reward.

Thus, selecting a different index variable 140 causes the hypermodel 112 to select different environment parameter values which, in turn, cause the environment model 114 to generate different predicted rewards.

In other words, instead of the environment parameters of the environment model 114 being learned through training, the environment parameters are instead set by the hypermodel output. Because different hypermodel outputs result in different environment parameters, selecting a different index variable 140 causes the environment model 114 to generate different predicted rewards, resulting in different action selection outputs 122 being generated.

The environment model 114 can have any appropriate architecture that allows the model 114 to map an input that includes an action and optionally an observation to a predicted reward.

As one example, the environment model 114 can be a linear model, i.e., a model that multiples the input to the model by a parameter matrix and then adds a bias value to the product to generate the predicted reward.

As another example, the environment model 114 can be neural network model that processes the input to the model through multiple neural network layers to generate the predicted reward.

Similarly, the hypermodel 112 can also have any appropriate architecture that allows the model 112 to map an index variable to a hypermodel output that includes a respective value for each of the environment parameters.

As a particular example, the hypermodel 112 can be a linear model. In this example, to generate the hypermodel output, the hypermodel 112 computes a product between: (i) a matrix specified by the hypermodel parameters and (ii) the index variable and then computes a sum of: (i) a result of the product and (ii) a bias vector specified by the parameters of the hypermodel to generate the hypermodel output.

As another example, the hypermodel 112 can be a neural network model having one or more neural network layers, with one or more layers of the neural network model having a non-linear activation function, e.g., computing an output for the layer by applying a non-linear activation function to an intermediate output of the layer.

In some cases, the hypermodel 112 is a single machine learning model, e.g., a single linear model or a single neural network model, and the values of all of the environment parameters are specified by the hypermodel output of the single machine learning model, i.e., the output of the single machine learning model includes a respective value for each of the environment parameters.

In some other cases, the hypermodel 112 includes multiple machine learning models, each of which generates an output that specifies the values of a corresponding proper subset of the environment parameters.

As a particular example, the environment model 114 can include a prior environment model and a differential environment model.

Both the prior environment model and the differential environment model can generate an individual action selection output and the final action selection output can be a combination, e.g., a sum or an average, of the individual action selection outputs.

For example, both the prior and differential environment models can be neural networks, both the prior and differential environment models can be linear models, or the prior environment model can be a linear model and the differential environment model can be a neural network.

In this example, the hypermodel 112 can include a prior machine learning model and a differential machine learning model. The values of the parameters of the prior environment model can be specified by the output of the prior machine learning model while the values of the parameters of the differential environment model are specified by the output of the differential environment model.

More specifically, in this example, the parameters of the prior machine learning model are fixed at initialization, i.e., at the beginning of the training of the hypermodel 112, while the parameters of the differential machine learning model can be learned through training the hypermodel 112.

In this example, the prior machine learning model can be a linear model with fixed parameter values while the differential machine learning model can be a linear model or a neural network model with parameter values that change during training.

Figure 1B:
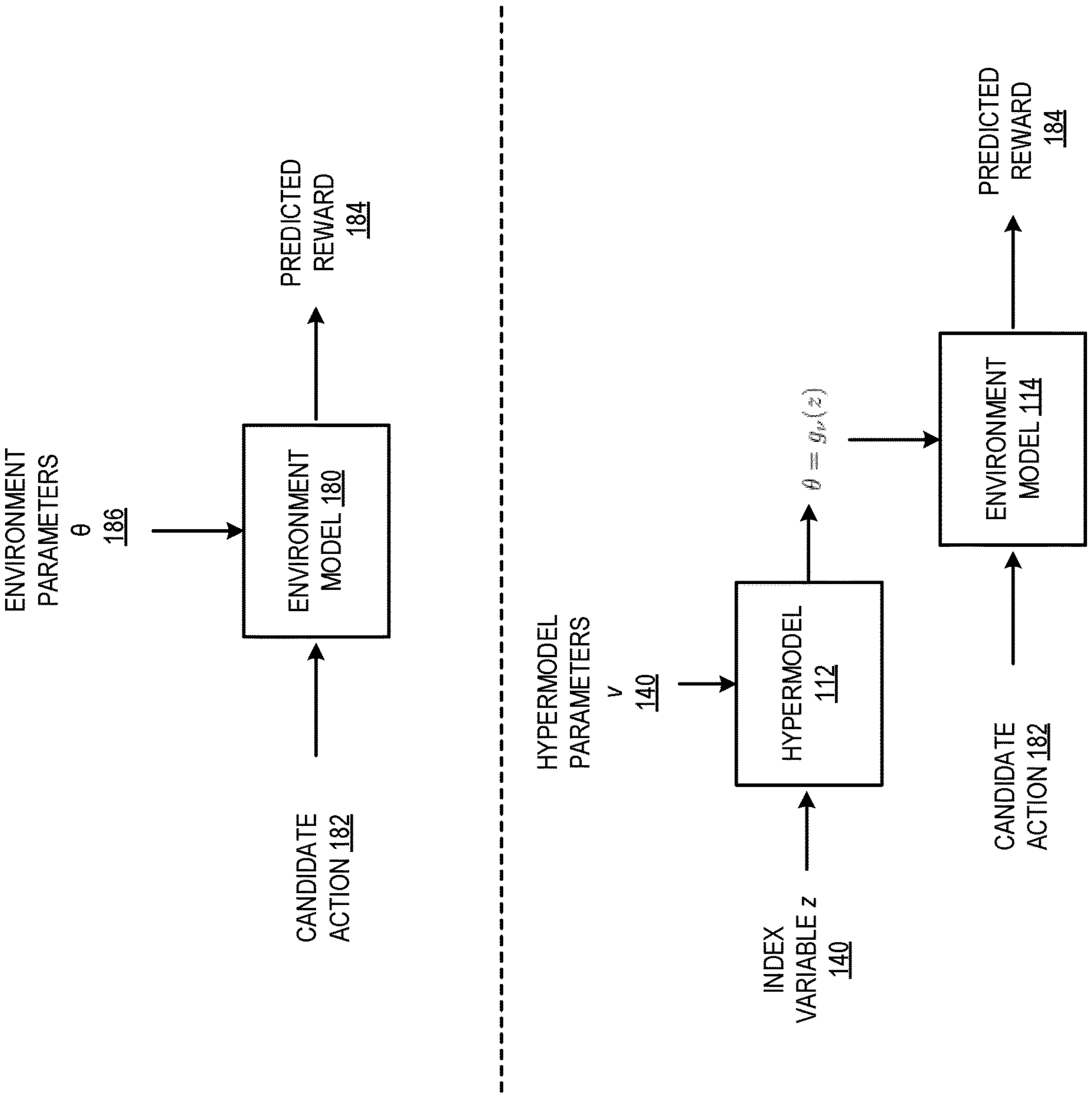
FIG. 1B shows the operation of an example hypermodel and environment model.

FIG. 1B shows an example of the operation of the hypermodel 112 and the environment model 114.

In particular, FIG. 1B shows the operation of a conventional environment model 180 that also generates predicted rewards. The conventional environment model 180 receives as input data identifying a candidate action 182, i.e., an action from the set of actions, and processes the data identifying the candidate action 182 in accordance with current values of the environment parameters $\theta$ of the environment model, i.e., values of the parameters that have been learned through training, to generate a predicted reward 184 for the candidate action 182.

When a hypermodel 112 is employed, the system instead first samples an index variable z 140. The system processes the index variable z using the hypermodel 112 in accordance with current values of the hypermodel parameters v 118. The hypermodel output $g_v(z)$ then specifies the values of the environment parameters $\theta$. That is, the system sets $\theta=g_v(z)$.

The system then processes the data identifying a candidate action 182 using the environment model 114 in accordance with the values $\theta=g_v(z)$ of the environment parameters to generate a predicted reward 184 for the candidate action 182.

How many index variables 140 the system 100 samples at a given time step and how the system 100 uses the resulting action selection output(s) to select the action that is performed by the agent 102 at the given time are dependent on the sampling technique used by the system 100 to control the agent 102.

As one particular example, the system can select the action 106 to be performed by the agent 102 at the time step using a Thompson sampling technique. When employing Thompson sampling, the system 100 can sample a single index variable 140 at the time step and then select the optimal action according to the action selection output 122 for the single index variable 140, i.e., select the action with the highest predicted reward value according to the action selection output 122.

As another particular example, the system can select the action 106 to be performed by the agent 102 at the time step using an information-directed sampling (IDS) technique. When employing IDS, the system 100 can sample multiple index variables 140 at the time step and then use the action selection outputs 122 for the index variables 140 to generate a probability distribution over the set of actions. The system 100 can then greedily select the action with the highest probability in the distribution or sample from the probability distribution to select the action 106 to be performed by the agent 102.

An example of selecting actions using IDS is described in more detail below with reference to FIG. 3.

The system 100 can then cause the agent 102 to perform the selected action 106, i.e., by transmitting a command to a control system for the agent 106 or by directly inputting the action 106 to the agent 102.

In order to improve the control of the agent 102, the training engine 150 trains the action selection system 110 by repeatedly updating the hypermodel parameters 118.

More specifically, because the environment parameters are specified by the outputs of the hypermodel 112, the training engine 150 trains the hypermodel 112 to update the values of the hypermodel parameters such that the hypermodel 112 generates environment parameter values that result in higher quality action selection outputs 122, e.g., to generate that result in higher rewards 124 being received by system 100 in response to actions 106 performed by the agent 102.

In other words, the training engine 150 trains the hypermodel parameters to optimize an objective function that measures an accuracy of action selection outputs generated using the environment model 114 in accordance with values of the plurality of environment model parameters specified by hypermodel outputs.

As a particular example, the training engine 150 can train the hypermodel 112 to minimize a loss function that penalizes the environment model 114 for errors between reward estimates generated by the environment model 114 and actual rewards received in response to performed actions. Optionally, the loss function can instead penalize the environment model 114 for errors between reward estimates and noisy actual rewards, i.e., actual rewards that have been perturbed with noise. Further optionally, the loss function can also penalize deviations of the hypermodel parameters from initial values of the hypermodel parameters.

An example of training the hypermodel 112 on such a loss function is described in more detail below with reference to FIG. 4.

When the hypermodel includes a prior machine learning model and a differential machine learning model, the training engine 150 holds the parameter values of the prior machine learning model fixed after initialization while adjusting the parameter values of the differential machine learning model during the training.

The training engine 150 can also impose additional constraints on the training of the hypermodel 112. For example, the training engine 150 can constrain the values of the parameter matrix or matrices of the hypermodel 112 to be diagonal or block diagonal to increase the computational efficiency of the training process.

Once the action selection system 110 is trained, the system 100 can either continue to use the action selection system 110 to control the agent 102 in interacting with the environment 104 or provide data specifying the trained action selection system 110, i.e., the trained values of the policy parameters, to another system for use in controlling the agent 102 or another agent.

Figure 2:
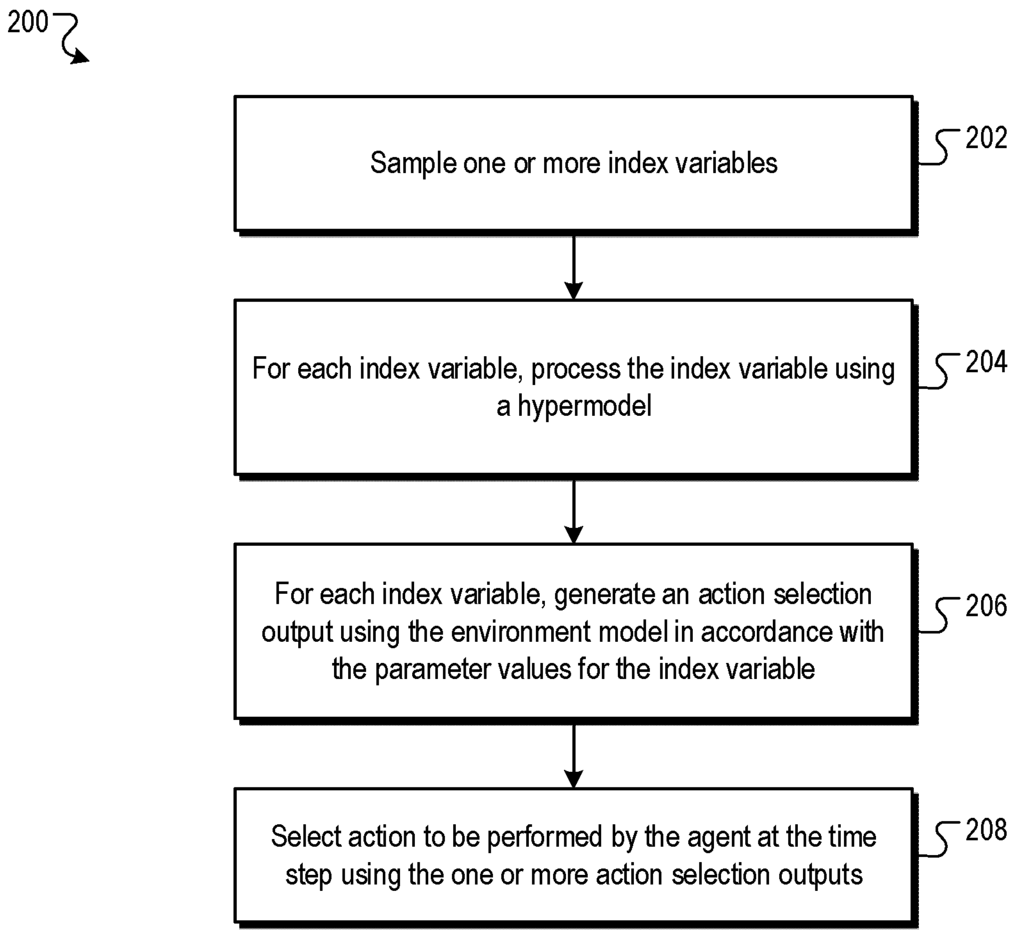
FIG. 2 is a flow diagram of an example process for selecting an action to be performed by an agent.

FIG. 2 is a flow diagram of an example process 200 for selecting an action to be performed by the agent. For convenience, the process 200 will be described as being performed by a system of one or more computers located in one or more locations. For example, a control system, e.g., the control system 100 of FIG. 1, appropriately programmed, can perform the process 200.

The system can repeatedly perform the process 200 at each of multiple time steps in order to control the agent as the agent interacts in the environment.

The system samples one or more index variables for the time step from a continuous space of possible index variables in accordance with a reference probability distribution over the continuous space of possible index variables (step 202).

The system can use any appropriate continuous probability distribution as the reference probability distribution that allows an index variable to sampled from a continuous space of possible index variables. Generally, each possible index variable will be an ordered collection of multiple numerical values, e.g., a vector with dimensionality greater than one. Accordingly, the reference probability distribution will generally be a multi-dimensional continuous probability distribution.

As a particular example, the space of possible index variables can be an n-dimensional Euclidean space (with n being a fixed integer greater than 1) and the probability distribution over the space of possible index variables can be a unit Normal distribution.

As another particular example, the space of possible index variables can be a hypersphere in a multi-dimensional space and the probability distribution over the space of possible index variables can be a uniform distribution over the points on the hypersphere.

The number of index variables the system samples is dependent on the sampling technique that is being used by the system to select the action.

For example, when performing a variant of Thompson sampling, the system can sample a single index variable from the reference probability distribution.

As another example, when performing a variant of IDS, the system can sample multiple index variables, i.e., a sample a fixed number of variables that is greater than 1, from the reference probability distribution.

For each sampled index variable, the system processes the index variable using the hypermodel in accordance with current values of the hypermodel parameters to generate a hypermodel output that specifies values of the environment parameters (step 204).

For each sampled index variable, the system generates an action selection output using the environment model in accordance with the values of the plurality of parameters of the environment model that are specified by the hypermodel output for the index variable (step 206).

In particular, the system generates the action selection output by, for each action in the set of actions, processing an input that includes data specifying the action using the environment model to generate a predicted reward, i.e., an estimate of a reward that would be received by the agent as a result of performing the action.

The system selects the action to be performed by the agent at the time step using the one or more action selection outputs for the one or more index variables (step 208).

How the system selects the action is dependent on the number of index variables the system sampled and on the sampling technique that is being used by the system to select the action.

For example, when the system is performing a variant of Thompson sampling and only sampled a single index variable from the reference probability distribution, the system can use the action selection output for that single index variable to select the action, i.e., by selecting the highest-quality action from the set of actions according to the action selection output.

As another example, when the system is performing a variant of IDS and sampled multiple index variables, the system can select the action using the multiple action selection outputs for the multiple index variables. This process is described in more detail below with reference to FIG. 3.

Figure 3:
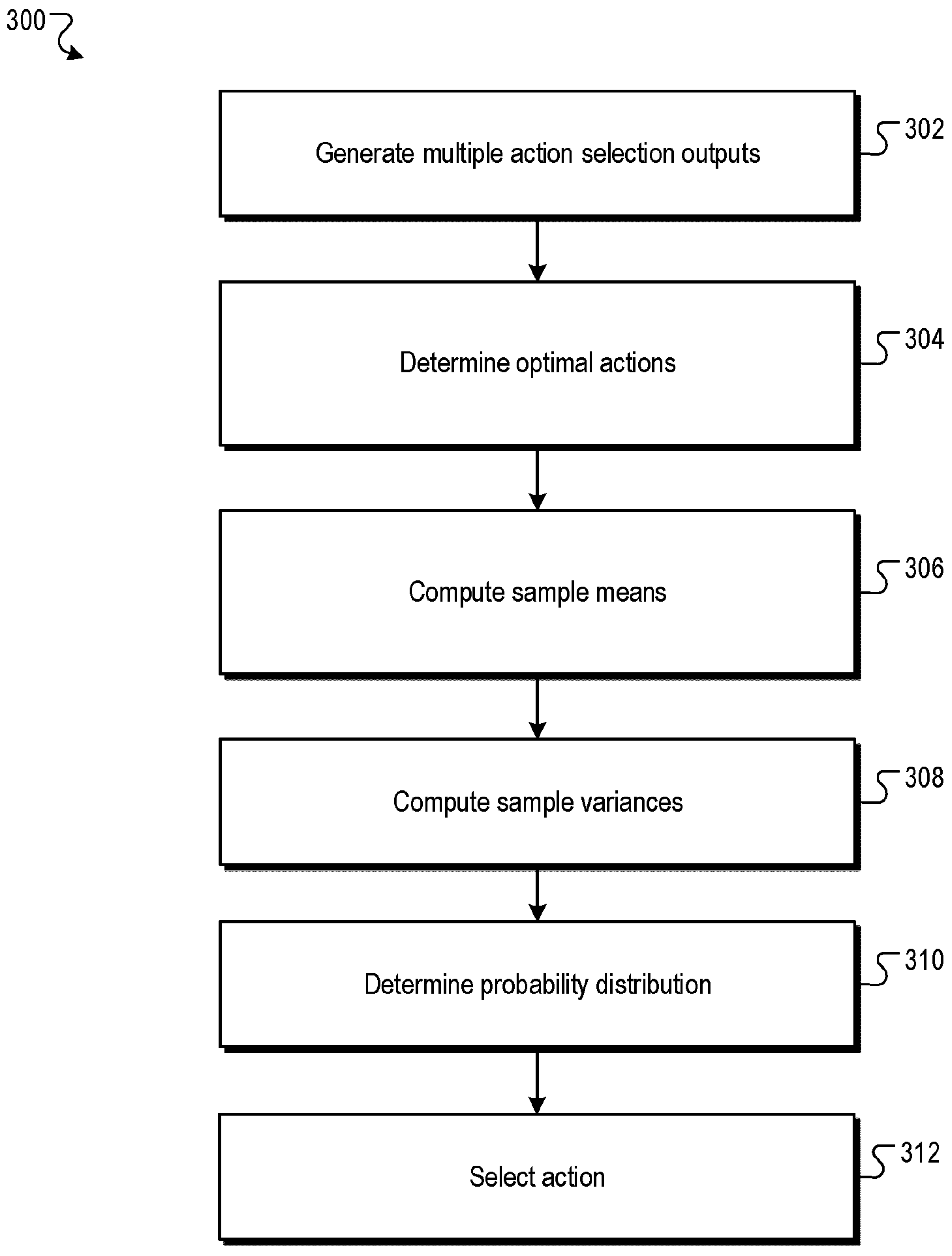
FIG. 3 is a flow diagram of an example process for selecting an action from multiple action selection outputs.

FIG. 3 is a flow diagram of an example process 300 for selecting an action using multiple action selection outputs. For convenience, the process 300 will be described as being performed by a system of one or more computers located in one or more locations. For example, a control system, e.g., the control system 100 of FIG. 1, appropriately programmed, can perform the process 300.

The system generates multiple action selection outputs for the time step (step 302). In particular, the system can sample multiple index variables and generate a respective action selection output for each index variable as described above with reference to FIGS. 1A, 1B and 2.

The system determines, for each index variable, the optimal action according to the action selection output for the index variable (step 304). In other words, the system determines the action with the highest predicted reward in each of the action selection outputs.

The system computes, for each action in the set of actions, a sample mean (step 306). To compute the sample mean for a given action, the system determines, for each index variable, the difference between (i) the predicted reward value assigned to the optimal action in the action selection output for the index variable and (ii) the predicted reward value assigned to the given action in the action selection output for the index variable. The system can then compute, as the sample mean, the mean of the differences for the given action.

The system computes, for each action in the set of actions, a sample variance (step 308).

In particular, the system identifies, for each action that is the optimal action for at least one variable, the partition of the sampled index variables for which that action is the optimal action. In other words, the system partitions the sampled index variables so that, within each partition, the sampled index variables all have the same optimal action.

To compute the sample variance for a given action, the system computes, for each partition, the square of the difference between (i) the mean predicted reward value assigned to the given action by the action selection outputs for the sampled variables in the partition and (ii) the mean predicted reward value assigned to the given action by the action selection outputs for all of the sampled variables. The system then computes a weighted sum of the differences for the partitions to generate the sample variance for the given action, with the difference for each partition being weighted by the fraction of total sampled index variables that are in the partition.

The system generates, from the sample means and variances for the actions in the set of actions, a probability distribution over the set of actions (step 310).

In particular, the system generates the probability distribution by identifying the probability distribution from the set of possible probability distributions over the set of actions that minimizes the ratio of (i) the square of the sum of weighted sample means for the actions in the set, where the sample mean for each action is weighted by the probability for the action in the possible probability distribution to (ii) the sum of weighted sample variances for the actions in the set, where the sample variance for each action is weighted by the probability for the action in the possible probability distribution.

By computing the probability distribution in this manner, the system ensures that each action that is not the optimal action for any sampled index variable is assigned a probability of zero. Additionally, because of the way that the above ratio is constructed, the probability distribution that minimizes the above ratio will generally have only a small fraction of nonzero probabilities. This allows for computationally efficient sampling and, when performed during the training of the hypermodel, results in computationally efficient training.

The system selects an action using the probability distribution (step 312). For example, the system can sample an action from the probability distribution or can greedily select the action with the highest probability according to the probability distribution.

Figure 4:
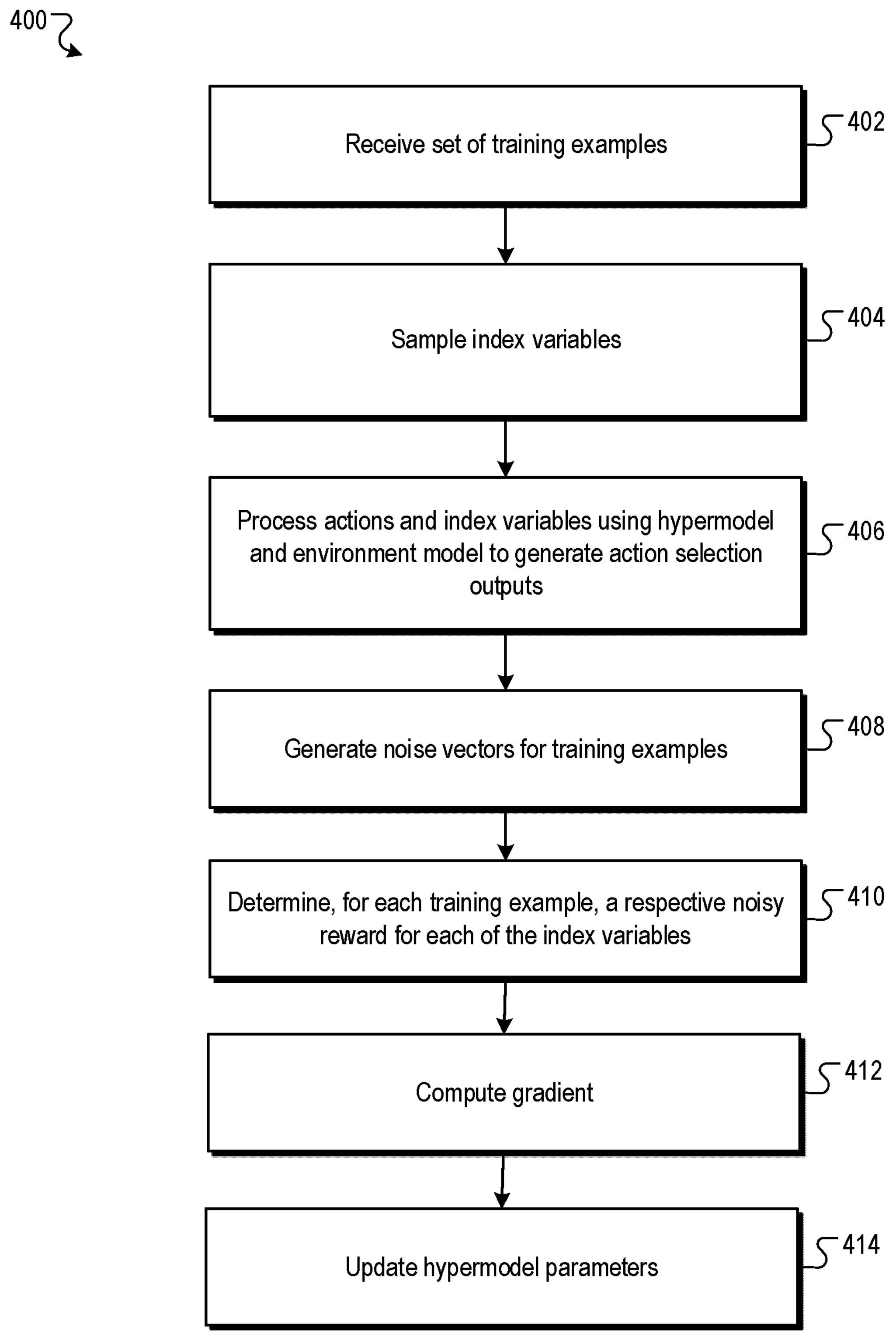
FIG. 4 is a flow diagram of an example process for training a hypermodel.

FIG. 4 is a flow diagram of an example process 400 for training a hypermodel. For convenience, the process 400 will be described as being performed by a system of one or more computers located in one or more locations. For example, a control system, e.g., the control system 100 of FIG. 1, appropriately programmed, can perform the process 400.

The system can repeatedly perform the process 400 on different sets, e.g., batches or mini-batches, of training examples to train the hypermodel by repeatedly updating the values of the hypermodel parameters.

The system receives a set of training examples (step 402). Each training example identifies at least an action that was performed by the agent and an actual reward received in response to the agent performing the action. In cases where the input to the environment model also includes an observation, each training example also includes the observation that was processed by the environment in order to select the action that was performed by the agent.

The system samples a plurality of index variables from the reference distribution (step 404).

The system processes the actions in the training examples, the plurality of index variables and, optionally, the observations in the training examples using the hypermodel and the environment model to generate a respective action selection output for each index variable and for each training example (step 406), i.e., as described above with reference to FIGS. 1A, 1B, and 2.

For each training example, the system generates a noise vector having the same dimensionality as the index variable (step 408). As a particular example, the system can also sample the noise vector from the reference distribution.

The system determines, for each training example, a respective noisy reward for each of the index variables (step 410). In particular, for a given index variable, the system can generate a perturbation from the given index variable and the noise vector for the training example and add the perturbation to the actual reward for the training example to generate the noisy reward for the given index variable.

The system then computes, for the set of training examples, a gradient of a loss function (step 412). Generally, the loss function measures errors between predicted reward values generated by the environment model for actions performed by the agent and corresponding noisy rewards. Optionally, the loss function can also penalize the hypermodel for values of the hypermodel parameters deviating from initial values of the hypermodel parameters.

As a particular example, the loss function L for a given set of training examples D selected from a set of training data $\tilde{D}$ can satisfy:

$$L(v, \tilde{D}, \tilde{Z}) = \frac{1}{|\tilde{Z}|}\sum_{z\in\tilde{Z}}\left(\frac{1}{2\sigma_w^2}\sum_{(xy,a)\in D}\left(y+\sigma_w a^T z - f_{g_v(z)}(x)\right)^2 + \frac{1}{2\sigma_p^2}\left\|g_v(z)-g_{v_0}(z)\right\|_2^2\right)$$

where v are the current values of the hypermodel parameters, $\tilde{Z}$ is the set of index variables that were sampled for the set of training examples, z is an index variable from the set $\tilde{Z}$, x is an action performed, y is a reward received in response to the action x, a is a noise vector, $g_v(z)$ is the hypermodel output generated by the hypermodel g for the index variable z in accordance with the current values of the hypermodel parameters, $f_{g_v(z)}(x)$ is the predicted reward value generated by the environment model by processing an input that includes the action x (and optionally an observation) in accordance with environment parameters specified by the hypermodel output $g_v(z)$, $g_{v_0}(z)$ is the hypermodel output generated by the hypermodel g for the index variable z in accordance with the initial values of the hypermodel parameters $v_0$, i.e., the initial values of the hypermodel parameters at the beginning of training or at some earlier point during training, and $\sigma_w$ and $\sigma_p$ are hyperparameters of the training process.

The system updates the current values of the hypermodel parameters using the gradient (step 414). For example, the system can multiply the gradient by a learning rate and then subtract the product from the current values of the hypermodel parameters or use a different optimizer, e.g., Adam or rmsProp, to map the gradient to an update to the current parameter values.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, .e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method for selecting actions to be performed by an agent interacting with an environment, the method comprising, at each of a plurality of time steps:

sampling one or more index variables from a continuous space of possible index variables in accordance with a probability distribution over the continuous space of possible index variables;

for each of the one or more index variables:

processing the index variable using a hypermodel in accordance with values of a plurality of parameters of the hypermodel, to generate a hypermodel output that specifies values of a plurality of parameters of an environment model neural network, wherein the plurality of hypermodel parameters are trained on a set of training examples to optimize an objective function that measures an accuracy of action selection outputs generated for the set of training examples using the environment model neural network in accordance with values of the plurality of environment model parameters specified by hypermodel outputs; and generating an action selection output using the environment model neural network in accordance with the values of the plurality of parameters of the environment model neural network that are specified by the hypermodel output for the index variable; and selecting the action to be performed by the agent at the time step using the one or more action selection outputs for the one or more index variables.

2. The method of claim 1, wherein generating an action selection output using the environment model neural network in accordance with the values of the plurality of parameters of the environment model neural network that are specified by the hypermodel output for the index variable comprises, for each action in a set of possible actions that can be performed by the agent:

processing an input comprising data specifying the action using the environment model neural network to generate an estimate of a reward that would be received by the agent as a result of performing the action.

3. The method of claim 2, wherein the input further comprises an observation characterizing a current state of the environment at the time step.

4. The method of claim 1, wherein selecting the action to be performed by the agent at the time step using the one or more action selection outputs for the one or more index variables comprises selecting the action to be performed by the agent at the time step using a Thompson sampling technique.

5. The method of claim 1, wherein selecting the action to be performed by the agent at the time step using the one or more action selection outputs for the one or more index variables comprises selecting the action to be performed by the agent at the time step using an information-directed sampling (IDS) technique.

6. The method of claim 1, wherein the probability distribution over the continuous space of possible index variables comprises a continuous probability distribution.

7. The method of claim 6, wherein the space of possible index variables comprises an n-dimensional Euclidean space and the probability distribution over the space of possible index variables is a unit Normal distribution.

8. The method of claim 6, wherein the space of possible index variables comprises a hypersphere and the probability distribution over the space of possible index variables is a uniform distribution.

9. The method of claim 1, wherein the hypermodel comprises a linear model.

10. The method of claim 9, wherein processing the index variable using the hypermodel to generate an output that specifies values of the plurality of parameters of the environment model neural network comprises:

computing a product between: (i) a matrix specified by the parameters of the hypermodel and (ii) the index variable; and computing a sum of: (i) a result of the product and (ii) a bias vector specified by the parameters of the hypermodel.

11. The method of claim 1, wherein the hypermodel comprises a neural network model, and wherein for one or more layers of the neural network model, computing an output of the layer comprises applying a non-linear activation function to an intermediate output of the layer.

12. The method of claim 1, wherein the environment model neural network comprises a linear model.

13. The method of claim 1, wherein the environment model neural network comprises a prior environment model and a differential environment model.

14. A system comprising one or more computers and one or more storage devices storing instructions that when executed by the one or more computers cause the one or more computers to perform operations for selecting actions to be performed by an agent interacting with an environment, the operations comprising, at each of a plurality of time steps:

sampling one or more index variables from a continuous space of possible index variables in accordance with a probability distribution over the continuous space of possible index variables;

for each of the one or more index variables:

processing the index variable using a hypermodel in accordance with values of a plurality of parameters of the hypermodel, to generate a hypermodel output that specifies values of a plurality of parameters of an environment model neural network, wherein the plurality of hypermodel parameters are trained on a set of training examples to optimize an objective function that measures an accuracy of action selection outputs generated for the set of training examples using the environment model neural network in accordance with values of the plurality of environment model parameters specified by hypermodel outputs; and generating an action selection output using the environment model neural network in accordance with the values of the plurality of parameters of the environment model neural network that are specified by the hypermodel output for the index variable; and selecting the action to be performed by the agent at the time step using the one or more action selection outputs for the one or more index variables.

15. One or more non-transitory computer storage media storing instructions that when executed by one or more computers cause the one or more computers to perform operations for selecting actions to be performed by an agent interacting with an environment, the operations comprising, at each of a plurality of time steps:

sampling one or more index variables from a continuous space of possible index variables in accordance with a probability distribution over the continuous space of possible index variables;

for each of the one or more index variables:

processing the index variable using a hypermodel in accordance with values of a plurality of parameters of the hypermodel, to generate a hypermodel output that specifies values of a plurality of parameters of an environment model neural network, wherein the plurality of hypermodel parameters are trained on a set of training examples to optimize an objective function that measures an accuracy of action selection outputs generated for the set of training examples using the environment model neural network in accordance with values of the plurality of environment model parameters specified by hypermodel outputs; and generating an action selection output using the environment model neural network in accordance with the values of the plurality of parameters of the environment model neural network that are specified by the hypermodel output for the index variable; and selecting the action to be performed by the agent at the time step using the one or more action selection outputs for the one or more index variables.

16. The non-transitory computer storage media of claim 15, wherein generating an action selection output using the environment model neural network in accordance with the values of the plurality of parameters of the environment model neural network that are specified by the hypermodel output for the index variable comprises, for each action in a set of possible actions that can be performed by the agent:

processing an input comprising data specifying the action using the environment model neural network to generate an estimate of a reward that would be received by the agent as a result of performing the action.

17. The non-transitory computer storage media of claim 16, wherein the input further comprises an observation characterizing a current state of the environment at the time step.

18. The non-transitory computer storage media of claim 15, wherein selecting the action to be performed by the agent at the time step using the one or more action selection outputs for the one or more index variables comprises selecting the action to be performed by the agent at the time step using a Thompson sampling technique.

19. The non-transitory computer storage media of claim 15, wherein selecting the action to be performed by the agent at the time step using the one or more action selection outputs for the one or more index variables comprises selecting the action to be performed by the agent at the time step using an information-directed sampling (IDS) technique.

20. The non-transitory computer storage media of claim 15, wherein the probability distribution over the continuous space of possible index variables comprises a continuous probability distribution.

* * * * *